3,151,186
BLEND OF BUTADIENE-ACRYLONITRILE
RUBBER, POLYVINYL CHLORIDE RESIN,
AND METAL HALIDE
Robert V. Lucke, Fanwood, N.J., assignor to United States Rubber Company, New York, N.Y., a corporation of New Jersey
No Drawing. Filed Mar. 16, 1962, Ser. No. 180,314
8 Claims. (Cl. 260—891)

This invention relates to a rubber-like composition characterized by improved compression set properties, and more particularly it relates to a composition of butadiene-acrylonitrile rubber compounded for sulfur vulcanization, vinyl chloride resin, and a metal halide selected from the group consisting of sodium chloride, zinc chloride and zinc bromide, as well as to a method of making such composition.

As described in British Patent 910,807, United States Rubber Co., published November 21, 1962, compositions based on a mixture of butadiene-acrylonitrile copolymer rubber (hereinafter referred to as nitrile rubber) and vinyl chloride resin, compounded with conventional sulfur curatives for the nitrile rubber, have many desirable properties, notably excellent resistance to attack by ozone. However, it is unfortunately found that the compression set properties of a vulcanized mixture of this kind are poor, presumably due to the fact that the thermoplastic vinyl resin component of the mixture appears to have an adverse effect on the compression set properties of the vulcanized nitrile rubber component. Accordingly, it is a principal object of the present invention to improve the compression set properties of the nitrile rubber/vinyl chloride resin blend.

I have now found, unexpectedly, that the addition of a small amount of a metal halide selected from the group consisting of sodium chloride, zinc chloride and zinc bromide to the vulcanizable butadiene-acrylonitrile copolymer rubber/vinyl chloride resin mixture results in greatly reduced compression set in the vulcanized mixture. I have further found that the best results are obtained by mixing the metal halide, selected from the group described, into the composition after the vulcanizing ingredient (sulfur or sulfur-donating material, usually with conventional accelerator of sulfur vulcanization) has been incorporated. In the preferred form of the invention the nitrile rubber/vinyl resin blend is prepared by mixing the resin in the form of a latex with the rubber in the form of a latex, thereafter removing the water and heating to a temperature sufficient to flux the mixture while subjecting it to mechanical working. Such blends are hereinafter referred to as latex blends. It is preferred that at least half, and more preferably all, of the mixed polymers be employed in the form of the described latex blend. Regardless of whether the polymers are blended in latex form or mill mixed in solid form, they should be fluxed together thoroughly with mechanical working at a temperature of about 270–380° F. Such fluxing together of the nitrile rubber and vinyl resin should be done prior to the addition of vulcanizing ingredients and the metal halide. If desired, additional nitrile rubber in solid form may be added to the prefluxed, masticated blend of nitrile rubber and vinyl resin to bring the total nitrile rubber content to a desired level within the range indicated below. The mix usually need not be fluxed again after mixing in such additional nitrile rubber. Similarly, more solid vinyl resin may be added to a prefluxed blend of nitrile rubber and vinyl resin, after which the mix may be fluxed again if desired.

The nitrile rubber/vinyl resin mixture employed in the invention comprises 25–80% (all quantities are expressed herein by weight, unless otherwise indicated) of butadiene-acrylonitrile copolymer rubber and correspondingly 75–20% of vinyl chloride resin, based on the combined weights of nitrile rubber and vinyl resin. The nitrile rubber generally has an acrylonitrile content of from about 20–45%, the balance usually being butadiene, although other modifying comonomers such as divinyl benzene may be incorporated in the copolymer in accordance with known practice. The vinyl chloride resin component may be vinyl chloride homopolymer itself, or equivalent copolymers of vinyl chloride with copolymerizable monomers such as vinyl acetate, vinylidene chloride, diethyl maleate etc. The vinyl resin should have a relatively high specific viscosity of at least about 0.3. In general, any of the diolefin-nitrile type rubbers and any of the vinyl chloride type resins disclosed in Serial No. 11,811 may be used herein.

The metal halide which is added to the mixture in accordance with the invention may be sodium chloride, zinc chloride or zinc bromide. Such metal halide is employed in amount of from about 3 to about 15 parts, per 100 parts of nitrile rubber plus vinyl resin in the mixture. The metal halide may be added as such to the mixture or as a solution in a convenient volatile solvent (e.g., water in the case of sodium chloride, alcohol in the case of zinc chloride) which is subsequently evaporated.

The mixture of the invention may further include other conventional compounding ingredients such as fillers or pigments, antioxidants, softeners or plasticizers, lubricants, stabilizers, and the like, in appropriate conventional amounts.

Sufficient vulcanizing ingredients are included in the mixture to vulcanize or cure the nitrile rubber portion of the mixture. Ordinarily sulfur is used as the vulcanizing agent, either in the form of elementary sulfur itself, and/or in the form of a sulfur or chemical, such as tetramethyl thiuram disulfide, usually along with the conventional accelerators of sulfur vulcanization, all in conventional amounts (e.g. from about 0.2 to 3 parts of sulfur per 100 parts by weight of mixed nitrile rubber and vinyl resin, depending on such variables as the amount of nitrile rubber and the degree of unsaturation therein, the amount and kind of accelerators present, the degree of vulcanization desired, and the particular vulcanizing conditions employed.) Of course such vulcanizing ingredients are added after fluxing of the mix has been completed, otherwise premature vulcanization or scorching could take place.

In accordance with the method of the invention, for best results it is necessary to complete the incorporation of the vulcanizing ingredients, prior to mixing in the metal halide. Such mixing may be accomplished in a conventional rubber mixer, whether an internal mixer of the Banbury type or an open roll mill. The mixing conditions are conventional and are of course such that premature vulcanization of the batch does not take place. Usually the mixing temperature does not exceed about 250°–270° F.

The mixture of the invention may be shaped into any desired useful form by the methods usually used for shaping rubber products, such as calendering, extrusion, and molding. The composition may be applied to textile fabrics or may have textile, wire or other reinforcement incorporated therein, to make useful articles of all sorts. After the desired shape has been imparted to the composition it is subjected to conventional vulcanizing conditions (e.g., a temperature of about 280° F. or less to about 360° F. or more for a period of from about 1 or 2 minutes to about 1 or 2 hours or more, the time and temperature being generally inversely related) to bring about cure or cross-linking of the nitrile rubber portion of the mixture by the sulfur curatives. It will be understood that the exact combination of time and temperature conditions suitable in a given case will depend upon such variables as the particular formulation, the amount of vulcanizing agent present, the presence or absence of accelerators, the size and shape of the article, the character of the heating device, the degree of vulcanization desired, etc. The resulting cured product not only has the excellent physical and chemical characteristics associated with the nitrile rubber/vinyl resin blends, but, in addition the product is indeed remarkable for the excellent compression set characteristics obtained. This renders the present product especially useful for making gaskets or the like, floor tiles, curtain wall seals, etc.

It is desired to emphasize that the beneficial action of the metal halide, selected from the group described, on the present vulcanizable nitrile rubber/vinyl resin mixture could never have been predicted or expected merely from the effects of metal halides on the individual polymers employed in the present mixture. Thus, metal halide added to nitrile rubber has been reported to have a curing action thereon (U.S. Patent 2,434,129, Throdahl) but in the present invention the metal halide is not employed for its curing action; instead the nitrile rubber in the present invention is compounded for cure with sulfur as described. Furthermore, nitrile rubber cured with metal halide has no better compression set than nitrile rubber cured with sulfur, and therefore there would be no reason to suspect that the metal halide would improve the compression set of the present sulfur-cured mixture. It is also desired to emphasize that metal halides are not in general operative in the present invention. Thus, magnesium chloride, calcium chloride and aluminum chloride do not provide improved compression set if it is attempted to substitute them for sodium chloride, zinc chloride or zinc bromide as used in the invention.

In addition, the results obtained by using metal halide of the class defined in accordance with the invention in a composition containing vinyl resin are completely unexpected because all the evidence of the prior art would indicate that the metal halide would destabilize the vinyl resin, and cause decomposition, discoloration, and degradation of physical properties. In fact, in accordance with prior commercial practice it would be unthinkable to put metal halide in a vinyl compound.

The compositions containing metal halide in accordance with the invention most surprisingly yield improved color stability, in tile stock for example, while at the same time providing increased resistance to indentation and improved tensile strength. In stocks representative of curtain wall seals improvements in compression set and tensile strength are evidenced. Compression set is an important property in seals of all kinds for as the composition takes on a permanent set imposed on it by the pressure of the object being sealed, the seal is less effective. This invention lowers the compression set to a range where it is practical to use the nitrile rubber/vinyl resin blend in places when it could not be considered a practical and useful material heretofore. Prior to this invention, compression set properties like those I have attained could not be had in a blend of this kind, insofar as I am aware.

Another remarkable feature of the invention resides in the fact that highly useful results are obtainable even in the complete absence of reinforcing fillers, for example in tile stock and the like.

It is desired to emphasize that one cannot achieve properties equal to those I have attained simply by blending nitrile rubber with vinyl resin and introducing the described metal halide as one of the compounding ingredients. It is necessary in addition to provide for sulfur vulcanization of the nitrile rubber and, for maximum effect, the metal halide should not be added until after the sulfur has been allowed to mill in a short time.

The improved resistance to light and heat aging, for example when the composition is subjected to Fadeometer aging, is particularly surprising since the metal halide would be expected to destabilize the vinyl resin in this respect.

The use of zinc chloride is particularly preferred in this invention, because it provides a greater improvement in compression set properties than does sodium chloride or zinc bromide.

The following examples, in which all parts are expressed by weight, will serve to illustrate the practice of the invention in more detail.

*Example 1*

To illustrate the advantage in tile stock, I prepared a masterbatch of such tile stock by a two pass Banbury mix as is well-known in the art as follows (e.g., each pass about 5 minutes at about 250° F.):

1st pass:
```
   Butadiene - acrylonitrile  rubber  containing
       about 27% acrylonitrile_____  35.0
   Blend of (latex blended, dried, prefluxed at
       320° F.)—
           Butadiene-acrylonitrile rubber contain-
               ing:
                   About 32% acrylonitrile, parts_  54
                   Polyvinyl chloride resin, parts_  76
                                                    ———
                                                    130
                                                         130.0
   Coumarone-indene resin (processing aid)___  15.0
   Antioxidants or stabilizers (e.g., nonyl phenyl
       phosphite, butylated bis phenol A)_____   2.5
   Dioctyl phthalate (plasticizer)_____  15.0
   Clay _____ 100.0
                                                         ———
                                                         297.0
```

2nd pass:
```
   1st pass material_____ 297.0
   Zinc oxide_____   3.0
   Titanium dioxide_____  40.0
   Clay _____ 200.0
   Calcined magnesia_____   2.0
                                                         ———
                                                         542.0
```

I then prepared two final stocks as follows:

|  | A | B |
|---|---|---|
| 2nd pass material | 542.0 | 542.0 |
| Benzothiazyl disulfide | 4.0 | 4.0 |
| Tetramethyl thiuram monosulfide | 0.5 | 0.5 |
| Phthalic anhydride (retarder) | 0.75 | 0.75 |
| Sulfur | 8.0 | 8.0 |
| Zinc chloride | | 5.0 |

These were mixed in a Banbury mixer (at about 250° F. for example) with a minute elapsed mixing time between the sulfur accelerator addition and the zinc chloride addition. Two minutes of mixing with the zinc chloride added then completed the cycle. These stocks were cured 10′ at 307° F. with the following results:

|  | A | B |
|---|---|---|
| 50% Modulus, p.s.i. | 2,000 | 3,250. |
| Tensile, p.s.i. | 2,150 | 3,520. |
| 1 Minute McBurney indentation, inches | 0.0278 | 0.0205. |
| 10 Minute McBurney indentation, inches | 0.0318 | 0.0232. |
| Fadeometer aging | Significant discoloration at 22 hours. | Very slight discoloration at 112 hours. |

The McBurney indentation values are obtained by a conventional test involving subjecting a sample to a standard load for a definite period of time, and then measuring the depth of the resulting indentation (after 1 minute and after 10 minutes).

Example 2

To illustrate the use of this invention in a curtain wall type stock and also to show the variation and less preferable results obtained if latex-blend nitrile-PVC material is not used, I mill mixed stocks as shown in the following table, wherein stocks A, B and C are based on a blend made by latex blending the nitrile rubber and vinyl resin, followed by drying and prefluxing with mastication at about 320° F., for example. Such prefluxed blend contained 42 parts of butadiene-acrylonitrile rubber (29% acrylonitrile) and 58 parts of polyvinyl chloride resin. Stock D, on the other hand, is based on a mill blend of the solid polymers rather than a latex blend. "B" and "C" stocks differ in that in "B" the zinc chloride was added before the accelerators and sulfur and in "C" the zinc chloride was added last. The mixing conditions were as stated in Example 1, except that in "D" stock the mill temperature was raised to about 320° F. to provide fluxing of the vinyl-nitrile blend to give a material as close as possible to the latex blended mixes.

|  | A | B | C | D | E |
|---|---|---|---|---|---|
| Latex blended mix | 100.0 | 100.0 | 100.0 | | |
| Butadiene-acrylonitrile rubber containing 29% acrylonitrile | | | | 70.0 | 100.0 |
| Polyvinyl chloride resin | | | | 30.0 | |
| Dioctyl adipate, DOA | 10.0 | 10.0 | 10.0 | 10.0 | 10.0 |
| Silica | 45.0 | 45.0 | 45.0 | 45.0 | 45.0 |
| Benzothiazyl disulfide | 1.5 | 1.5 | 1.5 | 1.5 | 1.5 |
| Diphenyl guanidine | 0.8 | 0.8 | 0.8 | 0.8 | 0.8 |
| Sulfur | 1.0 | 1.0 | 1.0 | 1.0 | 1.0 |
| Stabilizer (e.g. barium-cadmium stearate) | | | | 1.0 | |
| Zinc chloride | | 5.0 | 5.0 | 5.0 | 5.0 |

Curing 60' at 292° F. provided the following data:

|  | A | B | C | D | E |
|---|---|---|---|---|---|
| 200% Modulus, p.s.i | 1,400 | 2,060 | 2,230 | 2,570 | 860 |
| Tensile, p.s.i | 2,960 | 3,170 | 3,130 | 2,570 | 2,090 |
| Tear strength (ASTM-D624-54), pounds per inch | 490 | 520 | 510 | 400 | 270 |
| Compression set after 22 hours at 158° F. (ASTM-D395-55), percent | 62.2 | 40.3 | 29.3 | 46.7 | 27.4 |

It can be seen that the addition of zinc chloride to the blend allows development of resistance to compression set near that for the straight nitrile rubber despite the presence of 30 parts of thermoplastic PVC which would ordinarily *detract* from this property.

Example 3

|  | A | B | C | D | E |
|---|---|---|---|---|---|
| Latex blend as in Example 2 | 100.0 | 100.0 | 100.0 | 100.0 | 100.0 |
| Dioctyl adipate | 10.0 | 10.0 | 10.0 | 10.0 | 10.0 |
| Silica | 45.0 | 45.0 | 45.0 | 45.0 | 45.0 |
| Benzothiazyl disulfide | 1.5 | 1.5 | 1.5 | 1.5 | 1.5 |
| Diphenyl guanidine | 0.8 | 0.8 | 0.8 | 0.8 | 0.8 |
| Sulfur | 1.0 | 1.0 | 1.0 | 1.0 | 1.0 |
| Magnesium chloride | 5.0 | | | | |
| Calcium chloride | | 5.0 | | | |
| Aluminum chloride | | | 5.0 | | |
| Sodium chloride | | | | 5.0 | |
| Zinc bromide | | | | | 5.0 |

Cure at 292° F.: Tensile Data, p.s.i., Unaged

|  | A | B | C | D | E |
|---|---|---|---|---|---|
| 200% Modulus, 60' | 970 | 1,120 | 1,560 | 1,190 | 1,430 |
| Tensile, 60' | 2,040 | 2,190 | 1,870 | 2,330 | 2,400 |
| Elongation, 60' | 550 | 510 | 280 | 500 | 400 |
| Tear Strength, Pounds Per Inch, 60' | 440 | 460 | 400 | 450 | 500 |
| Compression Set, Aged 22 Hrs. at 158° F., 6'/292° F., Ave | 78.9 | 72.1 | 73.3 | 45.6 | 60.7 |

In Example 3, samples D and E, which use sodium chloride and zinc bromide, represent the invention and demonstrate noticeable improvement (reduction) in the compression set. On the other hand, samples A, B and C, which use magnesium chloride, calcium chloride and aluminum chloride, are outside the invention and show no improvement in compression set.

Having thus described my invention, what I claim and desire to protect by Letters Patent is:

1. A vulcanized composition characterized by improved compression set properties comprising 100 parts by weight of a polymer blend of 25–80% by weight of butadiene-acrylonitrile copolymer rubber and correspondingly 75–20% by weight of polyvinyl chloride resin, 0.2 to 3 parts by weight of sulfur, and 3 to 15 parts by weight of a metal halide selected from the group consisting of sodium chloride, zinc chloride and zinc bromide.

2. A composition as in claim 1 in which the said metal halide is zinc chloride.

3. A composition as in claim 1 in which at least half of said polymer blend is a latex blend made by blending aqueous latices of the said rubber and resin and then coagulating.

4. A method of making a vulcanized composition characterized by improved compression set properties comprising intimately blending from 25 to 80 parts by weight of butadiene-acrylonitrile copolymer rubber, and correspondingly 75 to 20 parts by weight of polyvinyl chloride resin, 0.2 to 3 parts by weight of sulfur, and 3 to 15 parts by weight of a metal halide selected from the group consisting of sodium chloride, zinc chloride and zinc bromide, and thereafter vulcanizing the resulting mixture at a temperature of from 280° to 360° F. for a period of from one minute to two hours.

5. A method as in claim 4 in which the said metal halide is zinc chloride.

6. A method as in claim 4 in which at least half of the blend of butadiene-acrylonitrile rubber and polyvinyl chloride resin is prepared by blending aqueous latices of the said rubber and resin and then coagulating.

7. A method of making a vulcanized composition characterized by improved compression set properties comprising latex blending 25 to 80 parts by weight of butadiene-acrylonitrile copolymer rubber and correspondingly 75 to 20 parts by weight of polyvinyl chloride resin, fluxing the resulting blended polymers at a temperature of 270–380° F., thereafter mixing in 0.2 to 3 parts by weight of sulfur, subsequently mixing in from 3 to 15 parts by weight of a metal halide selected from the group consisting of sodium chloride, zinc chloride and zinc bromide, and thereafter vulcanizing the resulting mixture at a temperature of from 280° to 360° F. for a period of from one minute to two hours, the said latex blending being done by blending aqueous latices of the said rubber and resin and then coagulating.

8. A method as in claim 7 in which the said metal halide is zinc chloride.

References Cited in the file of this patent
UNITED STATES PATENTS

| | | |
|---|---|---|
| 2,330,353 | Henderson | Sept. 28, 1943 |
| 2,434,129 | Throdahl | Jan. 6, 1948 |
| 2,614,094 | Wheelock | Oct. 14, 1952 |
| 2,808,387 | Parks et al. | Oct. 1, 1957 |
| 2,902,460 | Jennings et al. | Sept. 1, 1959 |
| 2,924,545 | Daly | Feb. 9, 1960 |

OTHER REFERENCES

Moulton: India Rubber World, volume 116, pp. 371–373 (1947).